(No Model.)

P. S. RYAN.
MILK STRAINER AND AERATOR.

No. 526,637. Patented Sept. 25, 1894.

Attest
Wm. T. Hall.

Inventor
Patrick S. Ryan
by Ellis Spear
Atty.

UNITED STATES PATENT OFFICE.

PATRICK S. RYAN, OF RUTLAND, VERMONT.

MILK STRAINER AND AERATOR.

SPECIFICATION forming part of Letters Patent No. 526,637, dated September 25, 1894.

Application filed February 21, 1894. Serial No. 501,004. (No model.)

*To all whom it may concern:*

Be it known that I, PATRICK S. RYAN, a citizen of the United States of America, residing at Rutland, in the county of Rutland and State of Vermont, have invented certain new and useful Improvements in Milk Strainers and Aerators, of which the following is a specification.

My invention relates to improvements in milk strainers and aerators and the object of the invention is to provide a simple and effective device and one which may be produced at an extremely low cost.

The invention is illustrated in the accompanying drawings, in which—

Figure 1:
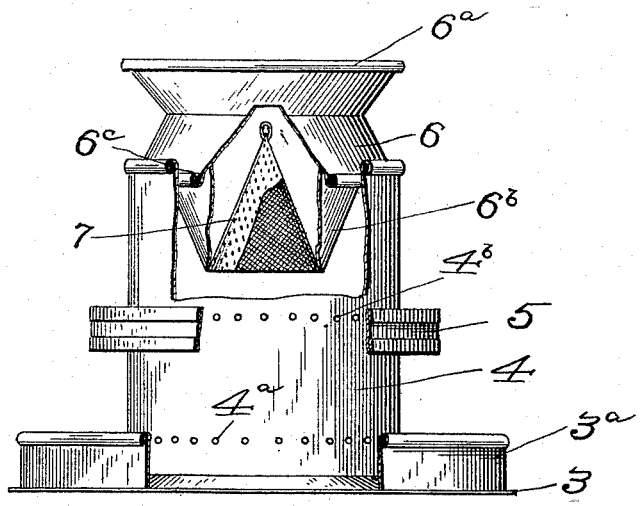
Figure 2:
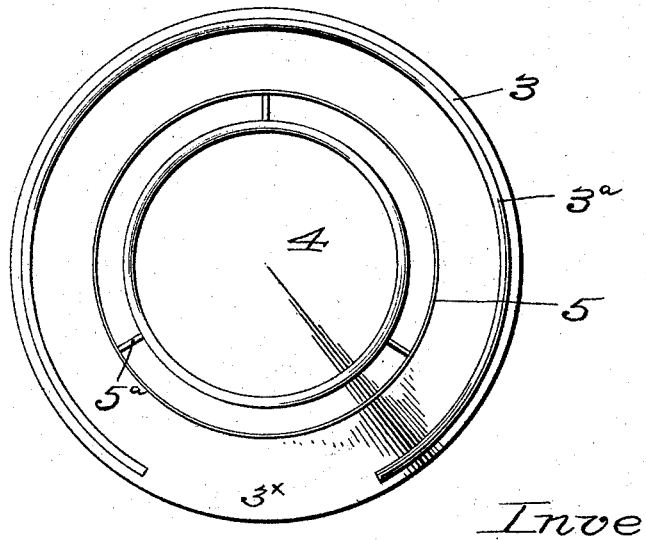

Figure 1, represents an elevation of an aerator and strainer, partly broken away, and Fig. 2, is a plan view of the aerator.

The aerator consists simply of a base portion 3 having a raised flange $3^a$, and a centrally located reservoir 4 for holding the milk. A row of perforations $4^a$ is provided slightly above the bottom but below the upper edge of the flange $3^a$ through which the milk passes in fine streams when the reservoir is filled. A second row of perforations $4^b$ is provided higher up on the reservoir to facilitate the passage of the milk through the aerator, and in order to prevent the milk from spurting out beyond the upper edge of the flange $3^a$ from these upper perforations an annular guard band 5 is provided supported by arms $5^a$ soldered or otherwise secured to the face of the reservoir. The streams of milk spurting through the perforations $4^b$ will thus be caught by the band and the milk will drop directly down into the annular channel beneath the milk being thus thoroughly aerated in its passage. One side of the flange $3^a$ is broken away at $3^\times$ to provide a suitable outlet for the milk.

The milk strainer is removably supported on the top of the reservoir and depends within the same. It consists of a casing 6 having a flaring mouth $6^a$, and a tapering open ended lower portion $6^b$. This lower end is provided with a conical strainer 7 projecting up within the casing. The annular flange or enlargement $6^c$ rests upon or against the upper edge of the reservoir and serves to support the strainer.

Having thus described my invention, what I claim is—

A milk aerator comprising the strainer, the base and the cylindrical reservoir extending from the strainer to the base having the two rows of perforations one slightly above the base and the other elevated, each row of perforations having a guard ring opposite the same, and with a free air space between said rings, the lower ring forming a flange projecting up from the base and having a discharge opening therein and the upper ring being of less diameter than the lower ring so that the discharge from the upper row of perforations will fall within the lower ring to mingle with the jets issuing from the lower perforations, substantially as described.

In testimony whereof I affix my signature in presence of two witnesses.

PATRICK S. RYAN.

Witnesses:
C. W. WEST,
CHAS. W. MUSSEY.